United States Patent [19]

Lichti et al.

[11] Patent Number: 5,033,327
[45] Date of Patent: Jul. 23, 1991

[54] CAMSHAFT PHASING DRIVE WITH WEDGE ACTUATORS

[75] Inventors: Thomas H. Lichti; Ronald A. Waydelis; Michael J. Niemiec, all of Rochester; Mark A. Shost; Kenneth A. Kovacevich, both of Henrietta; Thomas G. Elphick, Hilton, all of N.Y.

[73] Assignee: General Motors Corporation, Detroit, Mich.

[21] Appl. No.: 418,018

[22] Filed: Oct. 10, 1989

[51] Int. Cl.⁵ .............................................. F16H 53/00
[52] U.S. Cl. .................................... 74/568 R; 74/567
[58] Field of Search ................. 74/568 R, 567; 464/2; 123/90.15, 90.17

[56] References Cited

U.S. PATENT DOCUMENTS

| | | | |
|---|---|---|---|
| 1,531,909 | 3/1925 | Engemann . | |
| 3,378,829 | 9/1967 | Takahashi et al. | 74/568 R |
| 3,656,370 | 4/1972 | Wilson | 74/568 R |
| 3,678,225 | 7/1972 | Hulterstrum | 74/568 R |
| 4,627,825 | 12/1986 | Bruss et al. | 464/2 |
| 4,723,517 | 2/1988 | Frost | 74/568 R |
| 4,885,437 | 12/1989 | Tenniswood et al. | 74/568 R |
| 4,889,086 | 12/1989 | Scapecchi et al. | 123/90.15 |
| 4,895,113 | 1/1990 | Speier et al. | 123/90.17 |

FOREIGN PATENT DOCUMENTS 0356162  2/1990  European Pat. Off. ......... 123/90.15

Primary Examiner—Vinh T. Luong
Attorney, Agent, or Firm—Robert J. Outland

[57] ABSTRACT

A phase adjuster for engine camshafts and the like includes in a preferred embodiment a sprocket driving a camshaft attached hub through paired wedge packs that transfer torque and maintain a lash free connection. A plunger actuated by engine oil pressure and coacting drive springs axially move alternate active wedges to oppositely vary the arcuate lengths of the wedge packs and thereby change the phase angle between the sprocket and camshaft. A three way valve shuts off pressure oil flow except when needed to advance the plunger, thus minimizing oil flow requirements.

10 Claims, 4 Drawing Sheets

CAMSHAFT PHASING DRIVE WITH WEDGE ACTUATORS

TECHNICAL FIELD

This invention relates to phase adjusting drives and especially to camshaft phasing devices for varying the timing of valve actuation by an engine driven camshaft More particularly, the invention relates to camshaft phasing drives and devices employing paired wedges or wedge packs for controlling cam timing.

BACKGROUND

It is known in the art relating to engine valve gear to provide various means for varying valve timing as desired for the control of engine performance and efficiency. Among the various types of variable valve timing devices employed have been camshaft phasing devices, often in the form of drive pulleys and the like incorporating phase changing means for varying the phase between a rotatably driving input member such as a gear, pulley or sprocket and a rotatably driven output member such as a camshaft.

SUMMARY OF THE INVENTION

The present invention provides an especially compact and effective form of phase adjusting (or phasing) drive which, in a preferred embodiment, is applied in an engine camshaft drive to vary the phase or timing of a driven camshaft relative to a driving member, such as a sprocket, that is driven in timed relation to an engine crankshaft or the like.

The phasing drive of the invention employs the concept of paired wedges, or wedge packs, positioned in opposing fashion and movable together to positively control phase changes in either direction. Preferably multiple wedges are used in each pack to multiply the angular phase change obtained from a small axial movement of actuating means such as a hydraulic piston.

A preferred embodiment of the invention provides a compact camshaft connected phase adjusting drive including the additional features of (1) arcuately oriented paired wedge packs having alternately engaged oppositely facing passive and active wedges with helical engaging surfaces, (2) a hydraulic plunger for oppositely actuating the active wedges axially in the two packs in advancing and retarding motions to arcuately expand or contract the wedge packs, (3) helically sided wedges with passive end wedges having one flat side for engaging the drive and driven members on non-helical drive surfaces to reduce machining complexity, and (4) the use of net-formed (e.g. powder metal) wedges to remove the need to machine the helical surfaces.

These and other features and advantages of the invention will be more fully understood from the following description of certain specific embodiments of the invention taken together with the accompanying drawings.

BRIEF DRAWING DESCRIPTION

In the drawings:

FIG. 1 pictorial view partially in cross section showing a phase adjusting camshaft drive (phaser) and camshaft assembly according to the invention;

FIG. 2 is an exploded pictorial view of the phaser of FIG. 1;

FIG. 3 a cross-sectional view along line 3—3 of FIG. 1 showing the phaser of FIG. 1 in an opposite phase position and prior to assembly with a camshaft;

DETAILED DESCRIPTION

Figure 1:
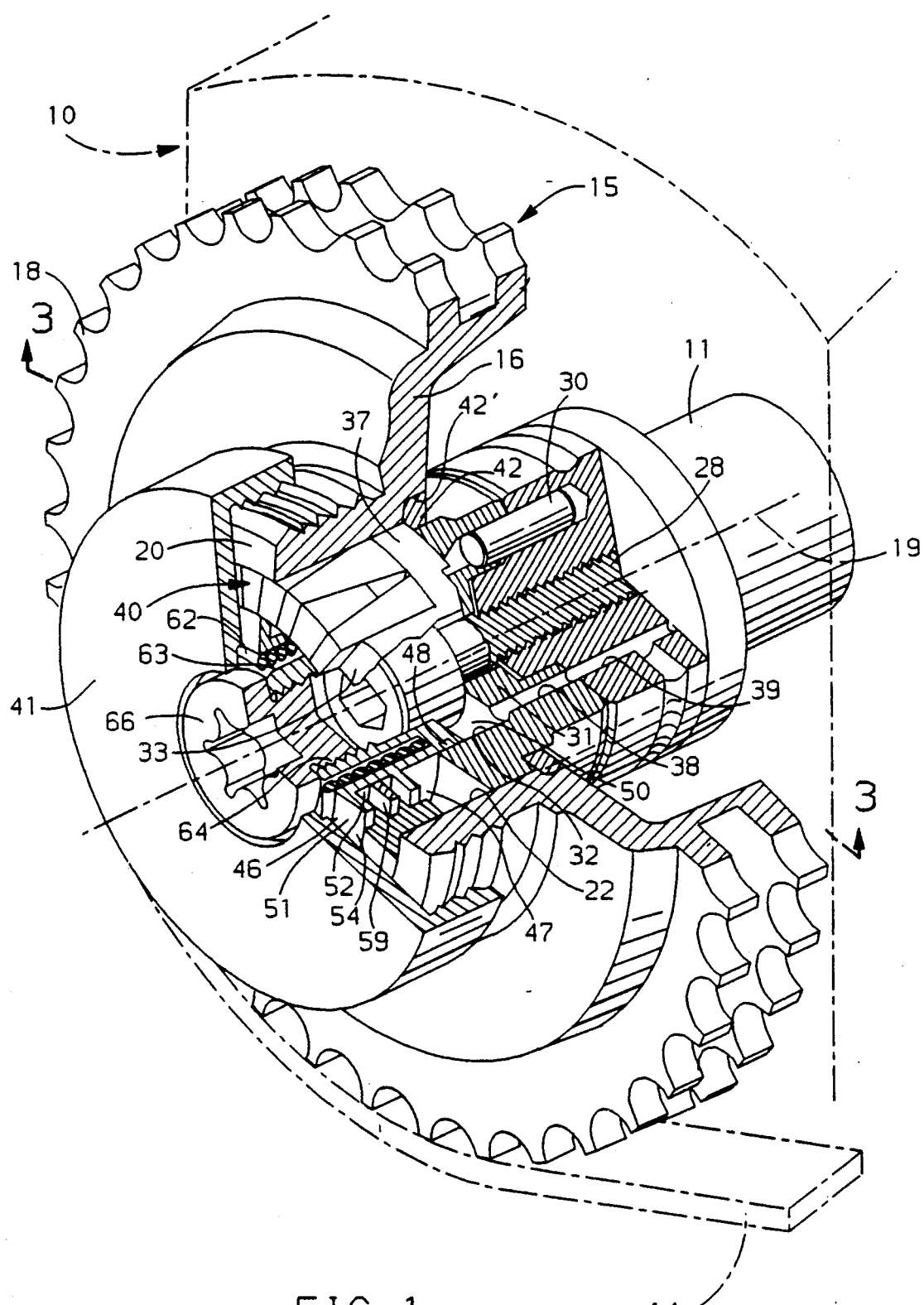
Figure 2:
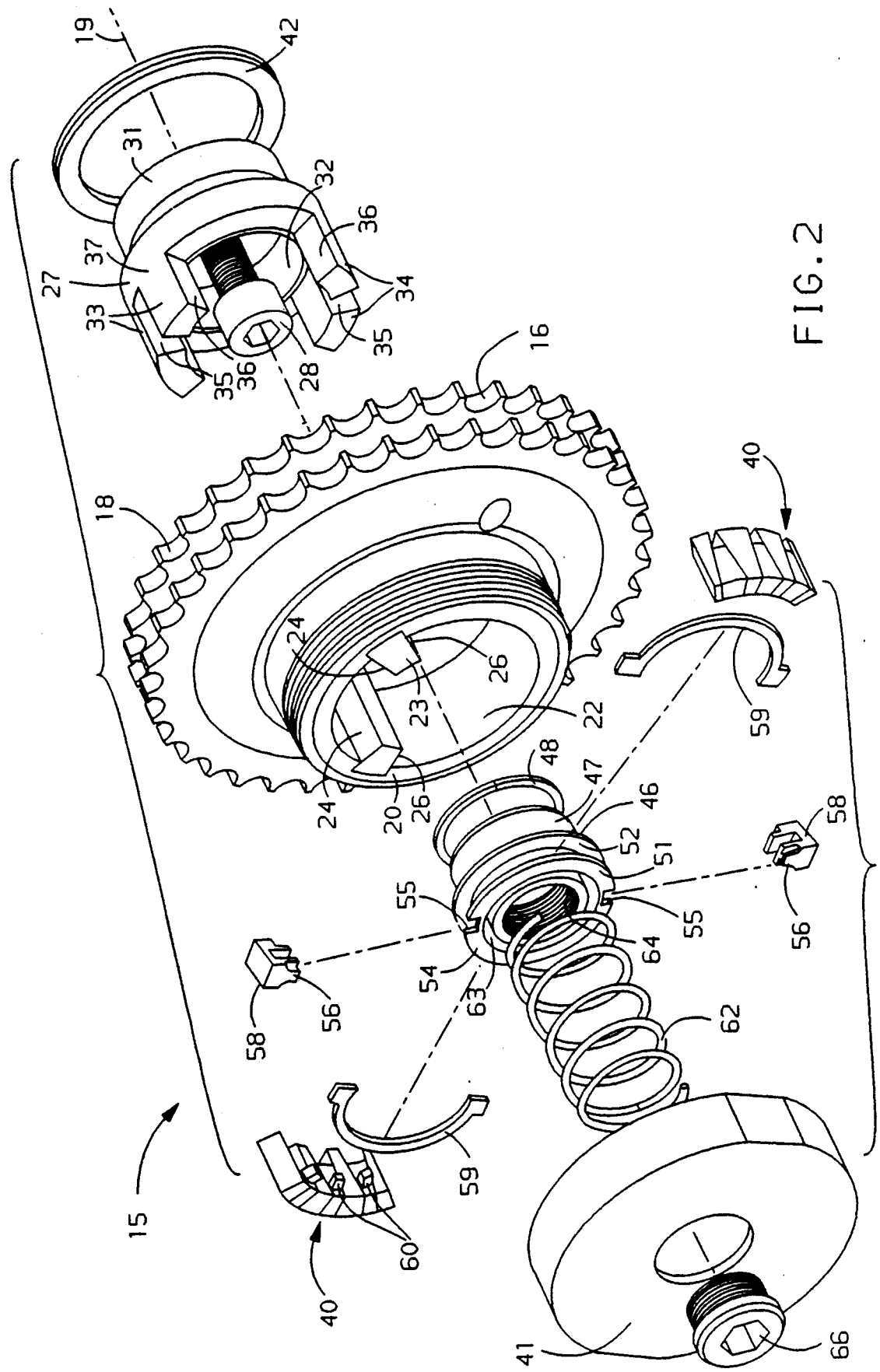
Figure 3:
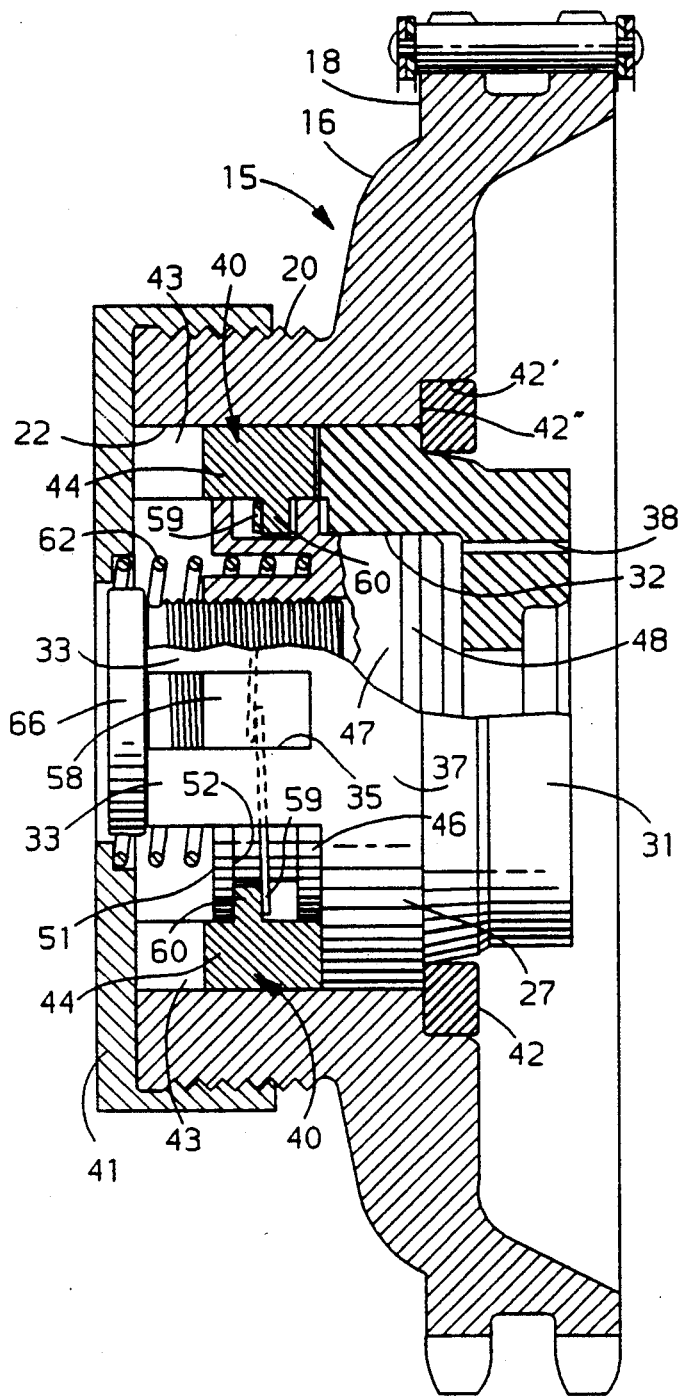

Referring now to the drawings in detail, numeral 10 generally indicates an internal combustion engine of a type having a camshaft 11 driven by a crankshaft (not shown) through a chain 14 or other suitable drive means. The camshaft carries a plurality of cams or lobes (not shown) for actuating the cylinder intake and/or exhaust valves (not shown) of the engine in known manner.

On the front, or driven, end of the camshaft there is a phase adjuster 15 that includes a sprocket 16. The sprocket comprises a drive member 16 having a peripheral drive portion, or wheel 18, that is toothed and is drivably engaged by the chain 14 for rotatably driving the sprocket 16 on an axis 19 that is coaxial with the camshaft 11. Within the wheel or toothed drive portion is a central portion 20 having an axial cylindrical opening 22. A pair of stops 23 are provided in and extend inwardly from the periphery of the opening 22 at circumferentially spaced locations. The stops each have generally oppositely facing longitudinally extending inner and outer side surfaces 24, 26.

A driven hub 27 is fixed to the front end of the camshaft by a central screw 28 and a pin 30 or other means for fixing their phase relationship. Adjacent to the mounted end 31, the hub defines an internal cylinder 32 at the far end of which are two pairs of arcuately spaced longitudinally extending upper and lower arms 33, 34, respectively. The arms also have generally oppositely facing longitudinally extending inner and outer side surfaces 35, 36. An external cylindrical surface of the hub cylinder portion 32 and arms 33, 34 forms a journal 37, received in the opening 22 of the sprocket for oscillatably supporting the sprocket 15. An oil passage 38 in the end 31 of the hub connects with a mating feed passage 39 in the camshaft for a purpose to be subsequently described.

The cylinder 32 portion and arms 33, 34 which define journal 37 of the hub are received within the opening 22 of the sprocket central portion with the outer side surfaces 36 of the lower arms 34 spaced arcuately from the outer side surfaces 26 of the stops 23. A pair of arcuately lengthenable and shortenable wedge packs 40 are disposed, each one extending between and engaging the side surface 26 of a respective one of the stops and the opposing side surface 36 of the cooperating arm. A cover 41, threadably or otherwise retained on the end of the sprocket central portion 20, retains the wedge packs within opening 22 and adjacent the cylinder 32 of the hub 27. A retaining ring 42 is received in an annular groove 42' of the sprocket and engages an annular shoulder 42" of the hub to maintain it in assembly with the sprocket. However, the ring 42 could be made integral with the sprocket or any other suitable retaining means could be used.

Each of the wedge packs 40 controls the minimum arcuate spacing between its respective stop and arm side surfaces, and the packs are arranged so that when one is arcuately lengthened, the other is equally shortened. Thus, the arcuate distances between the two stops and their cooperating arms are changed in equal and opposite amount and the phase angles between the chain driven sprocket 16 and the camshaft connected hub 27 are thereby altered.

Each of the wedge packs 40 (see FIG. 4) is made up of several passive wedges 43 having narrower ends facing axially in one direction alternating with active wedges 44 having their narrower ends facing axially in the opposite direction. The engaging surfaces of the wedges are preferably helical, although alternate sides of the wedges could be axially directed if desired and could thereby be made flat (planar).

The helical angle or lead of the wedges is sufficiently shallow that torque loads tend to lock the wedge packs by internal friction rather than urge the wedges to retract and shorten the arcuate length of the packs. The length of the passive wedges essentially extends from the hub cylinder 32 to the cover 41 so that motion of the passive wedges 43 is limited to an arcuate path about the axis 19. However, the active wedges 44 are substantially shorter, allowing them room for axial motion as well as arcuate.

Passive end wedges 45 preferably have flat axially extending outer surfaces which engage the side surfaces 26, 36 of the sprocket stops and hub arms. This avoids any need for machining helical surfaces on the sprocket and hub. If desired, the end wedges, stops and arms could have helical engaging surfaces. Alternatively, the wedge packs could be rearranged to use active wedges having one flat side as end wedges.

A plunger 46 is disposed within the sprocket opening 22 for limited reciprocating movement along the axis 19. The plunger includes a piston portion 47 which is reciprocably received in the cylinder 32 and carries a split seal ring 48 or other means to limit oil leakage. The piston 47 and the end 31 of the hub define a chamber 50 with which the oil passage 38 connects.

Adjacent the piston portion 47 is an enlarged (in this embodiment) actuating portion 51 that includes an annular groove 52 partly defining an outer flange 54 having opposite outwardly opening radial recesses 55. The recesses receive mating protrusions 56 of a pair of spring retainers 58 that are press-fitted into adjacent portions of the groove 52. The retainers 58 are slotted to receive outwardly flared ends of semi-annular leaf type drive springs 59 lying within the groove 52. Both the retainers and the flared ends of spring 59 extend radially between the upper arms 33 or lower arms 34 to prevent their rotation relative to the hub 27.

Also within the groove are individual fingers 60 extending radially inward from each of the active wedges 44 of the wedge packs 40 which are on opposite sides of the plunger 46 intermediate the spring retainers 58. The drive springs 59 are positioned to engage the fingers 60 and advance the active wedges 44 of the two packs to their engaged positions, thus expanding the packs to take up the clearance between the wedges and the surfaces 26, 36. The fingers of each pack are thus urged to positions adjacent opposite sides of the plunger groove 52.

A coil return spring 62 extends between the cover 41 and an annular recess 63 in the end of the plunger actuating portion 51 to bias the piston 47 into the cylinder 32 and compress the chamber 50. A threaded opening 64 is provided in the center of the plunger to allow access to the hub retaining screw 28. The opening 64 is closed by a threaded plug 66 to enclose the chamber 50.

Figure 4:
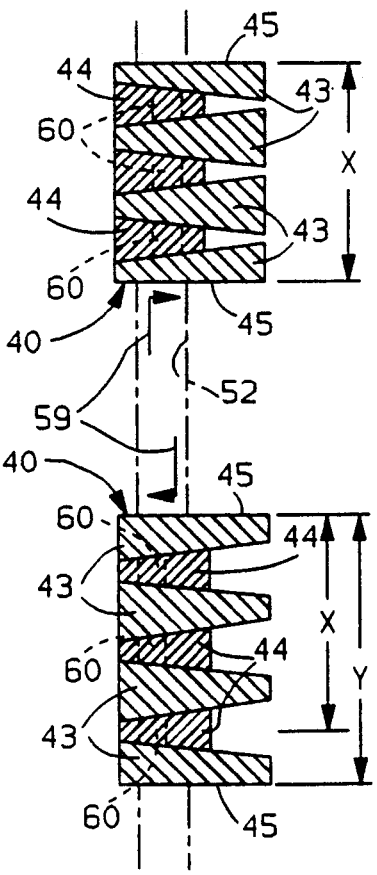
FIG. 4 is a schematic view illustrating the operation and arrangement of the wedge packs of the invention.

FIG. 4 shows schematically a linear representation of the arcuate relationship of the two wedge packs 40 and the associated plunger groove 52. The packs have a minimum arcuate length X and a maximum arcuate length Y. The fingers 60 of the active wedges are urged by the drive springs 59 (represented by bent arrows) to expand the packs 40 to take up the clearance in the available space which totals X+Y. Movement of the plunger groove 52 leftward as shown in the figure shortens the upper pack 40 while the lower pack is lengthened an equivalent amount by the action of its drive spring 59.

In operation, the return spring 62 normally forces the plunger piston 47 into the cylinder 32, fully expanding (arcuately lengthening) one of the wedge packs 40 and contracting (arcuately shortening) the other to move the camshaft 11 into a desired phase relation with the engine crankshaft and pistons, not shown. In one embodiment, this would retard the timing of the engine valves or, preferably, the inlet valves to improve low speed operation of the engine.

As the engine speed and/or load increases to a predetermined condition, engine oil pressure is supplied to the chamber 50 through the feed passage 39 and oil passage 38. The oil pressure is sufficient to overcome the force of the return spring 62 and move the plunger to its furthest position toward the cover 41. A side of the plunger groove 52 thereby engages the fingers 60 of the expanded wedge pack forcing them to retract and allow the pack to be arcuately shortened.

At the same time, the drive spring engaging the fingers of the other (contracted) wedge pack urges them in an advancing direction to expand and arcuately lengthen the pack until all the clearance is taken up. This changes the phase relation of the hub and sprocket and, thereby, the camshaft and crankshaft, preferably advancing the camshaft timing to provide improved operation of the engine in a mid range/high load condition. In order to resume the retard position, the oil pressure is removed and the return spring 62 returns the mechanism to the initial condition and camshaft timing.

Any desired manner of supplying oil to and discharging oil from the chamber 50 for actuating the plunger could be used. As shown schematically in FIG. 5, a preferred embodiment employs a three way valve, such as a solenoid actuated spool valve 67. Any suitable form and location of the valve and solenoid could be employed. In this embodiment, the valve 67 is placed so that in the retard position shown it blocks the flow of oil from the oil pressure gallery 68 to the chamber 50 while maintaining communication of the chamber with a discharge passage 70. The connection is through the oil passage 38 and feed passage 39 to an oil groove 71 in the camshaft bearing 72. The groove 71 in turn communicates with a connecting passage 74 which connects with the valve 67. When the solenoid is actuated, the valve moves to cut off communication with the discharge passage 70 and open the passage 38 to pressure oil flow from the gallery 68 to the chamber 50.

In this manner, the oil flow required to actuate the mechanism is limited to that needed to expand the chamber 50 when the valve 67 is actuated and no oil flow is required except when the timing is being changed in a chamber expanding direction. This reduces the size and power requirement of the engine oil pump and is in contrast to some other forms of hydraulic timing control which allow pressure oil to bleed off through an orifice as long as their pressure chamber is in a contracted condition and only block the flow when expansion of the chamber is desired.

Figure 5:
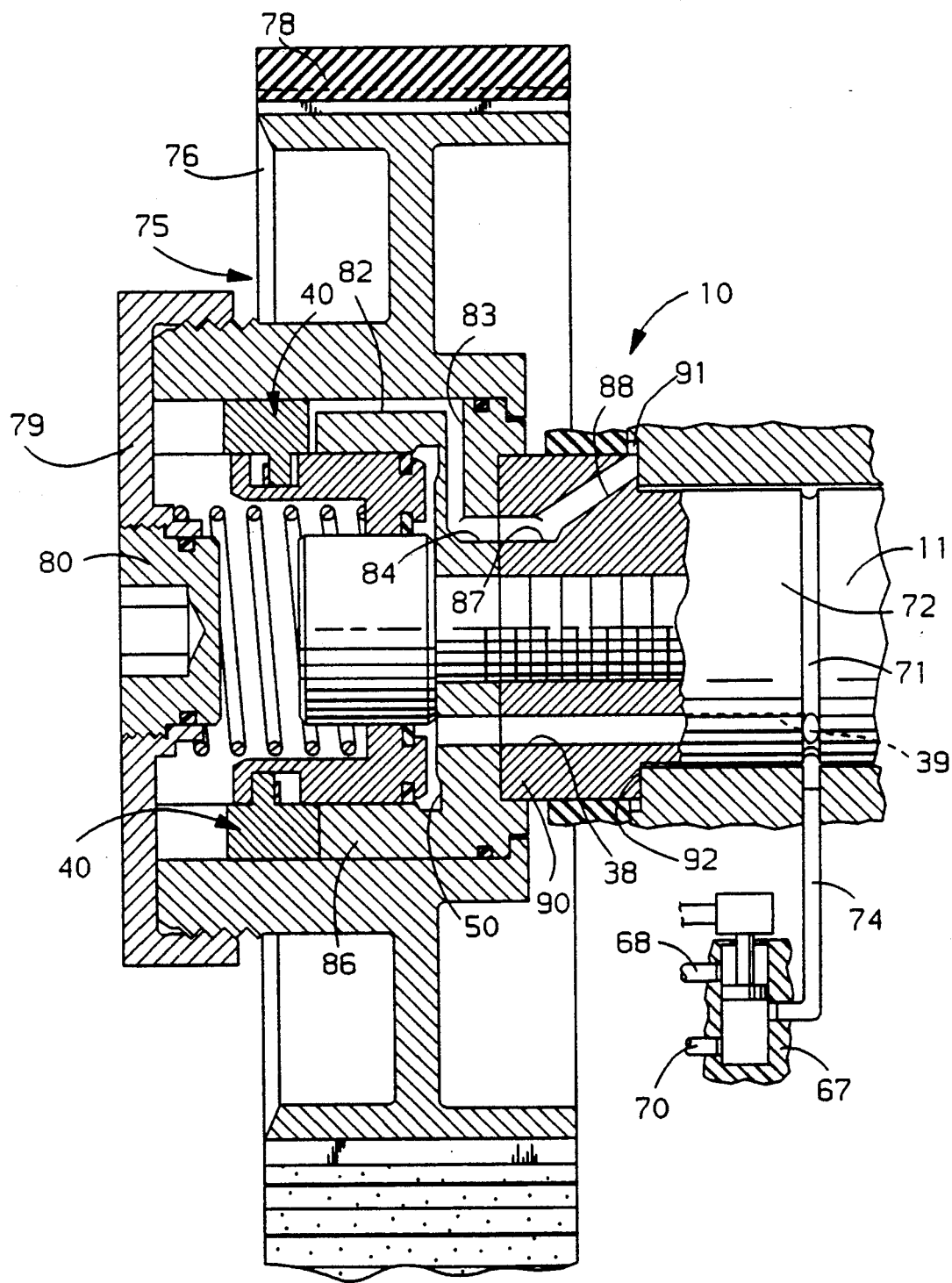
FIG. 5 is a cross-sectional view of an engine assembly including an alternative embodiment of phaser for use in a timing belt drive arrangement and illustrating oil control means for both embodiments.

FIG. 5 further discloses an alternative embodiment of phase adjuster, or phaser, according to the invention which is generally indicated by numeral 75. The device is similar to the embodiments of FIGS. 1-4 but, instead of a sprocket 16, uses a toothed pulley 76 driven by a reinforced rubberlike timing belt 78.

To prevent the undesirable escape of oil onto the timing belt 78, the unit includes a cover 79 having a central access opening closed by a sealed plug 80. Oil which leaks past the plunger piston 47 into the space adjacent the cover 79, wedge packs 40 and spring 62 is returned through internally connecting drain passages 82, 83, 84 in the hub 86, and drain passages 87, 88 in a camshaft thrust flange 90 to an annular space 91 surrounding a thrust surface 92. From space 91, the oil drains to the engine sump not shown. The remainder of the camshaft mounting and oil supply systems in the engine 10 are like those of the first described embodiment.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A phase adjusting drive comprising in combination
   a drive member rotatable on an axis,
   a drive member rotatable with said drive member on said axis,
   first and second wedge packs spaced radially from the axis and positioned between the drive and driven members in a manner to control their angular phase relation in opposite directions, and
   actuating means for retracting one of the wedge packs while coincidentally advancing the other to positively vary the angular phase relation of the drive and driven members.

2. A phase adjusting drive as in claim 1 wherein the wedge packs include passive wedges which are movable only in arcuate paths alternately engaged by active wedges which are movable together in paths having arcuate and transverse portions, each wedge pack having at least two active wedges to multiply the phase adjusting motion of the wedge pack.

3. A phase adjusting drive as in claim 2 wherein said transverse portions of the paths of motion of the active wedges are in directions generally parallel to said axis.

4. A phase adjusting drive as in claim 2 wherein said wedges have lead angles which are sufficiently shallow as to cause friction locking of the wedge packs against torque-induced phase changes between the drive and driven members.

5. A phase adjusting camshaft drive comprising in combination a drive member rotatable on an axis and including a peripheral drive portion adapted to be engaged by suitable driving means and a central portion having an axial cylindrical opening with at least one stop extending inward from the periphery of the opening and including generally oppositely facing longitudinally extending first and second stop surfaces, a driven hub member connectable with a camshaft for rotation on said axis, said hub member including an internal cylinder and a plurality of arms extending longitudinally from arcuately spaced portions adjacent one end of the cylinder, at least the arms of the hub member being received within the opening of the drive member and arcuately spaced from the first and second stop surfaces, first and second wedge packs spaced radially from the axis and each of the packs extending arcuately between one of the stop surfaces of the drive member and one of the arms of the hub member to control in both directions changes in angular phase relation of the drive member and hub, each of said wedge packs including alternately engaged oppositely facing wedges relatively movable in advancing and retracting motions to lengthen or shorten the arcuate length of the pack, and actuating means for retracting the wedges of one of the wedge packs to shorten said one pack while coincidentally advancing the wedges of the other wedge pack to lengthen said other pack and thereby adjust the arcuate spacing between the hub arms and their associated drive member stop surfaces so as to positively vary the phase relation of the drive and driven members.

6. A camshaft drive as in claim 5 wherein each wedge pack includes end wedges having straight outer sides engaging the stop surfaces and arms, the engaged surfaces of which extend parallel with said axis.

7. A camshaft drive as in claim 5 wherein each wedge pack includes passive and active wedges, the passive wedges being movable only in arcuate paths and the active wedges also being movable in arcuate paths as well as transverse thereto in advancing and retracting motions, each wedge pack having at least two active wedges to multiply the phase adjusting motion of the wedge pack.

8. A camshaft drive as in claim 7 wherein the actuating means includes a plunger reciprocably received in said internal cylinder of the hub, resilient means urging the hub in one actuating direction and means for admitting pressure fluid to the cylinder to force the plunger in an opposite direction, the plunger further including means engaging the active wedges for simultaneously moving them in said advancing and retracting motions.

9. A camshaft drive as in claim 7 wherein the wedges each have at least one helical surface, the wedges being formed to size to avoid machining of the helical surfaces.

10. A camshaft drive as in claim 5 wherein said wedges have lead angles which are sufficiently shallow as to cause friction locking of the wedge packs against torque-induced phase changes between the drive member and the hub.

* * * * *